(12) United States Patent
Ward et al.

(10) Patent No.: US 9,395,013 B2
(45) Date of Patent: Jul. 19, 2016

(54) FLOW CONTROL VALVE

(75) Inventors: Christopher Ward, Sycamore, IL (US); Peter Malone, Glenview, IL (US)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 679 days.

(21) Appl. No.: 13/261,469

(22) PCT Filed: Apr. 11, 2011

(86) PCT No.: PCT/EP2011/001787
§ 371 (c)(1),
(2), (4) Date: Dec. 13, 2012

(87) PCT Pub. No.: WO2011/124395
PCT Pub. Date: Oct. 13, 2011

(65) Prior Publication Data
US 2013/0081714 A1    Apr. 4, 2013

(30) Foreign Application Priority Data

Apr. 10, 2010   (DE) .......................... 10 2010 014 496

(51) Int. Cl.
| | |
|---|---|
| *F16K 31/06* | (2006.01) |
| *B60T 8/36* | (2006.01) |
| *F15B 13/04* | (2006.01) |
| *F15B 13/044* | (2006.01) |
| *F16K 39/04* | (2006.01) |
| *G05D 7/06* | (2006.01) |

(52) U.S. Cl.
CPC ........... *F16K 31/0675* (2013.01); *B60T 8/3665* (2013.01); *F15B 13/0402* (2013.01); *F15B 13/0442* (2013.01); *F16K 31/06* (2013.01); *F16K 31/0668* (2013.01); *F16K 39/04* (2013.01); *G05D 7/0635* (2013.01); *Y10T 137/7761* (2015.04); *Y10T 137/86879* (2015.04); *Y10T 137/8778* (2015.04)

(58) Field of Classification Search
CPC ..... F16K 31/0675; F16K 31/06; F16K 39/04; F16K 31/0668; F15B 13/0402; F15B 13/0442; B60T 8/3665; G05D 7/0635
USPC ..................................... 251/129.07
See application file for complete search history.

(56) References Cited

U.S. PATENT DOCUMENTS 6,021,997 A * 2/2000 Hell .................... F15B 13/0403
251/129.07
6,916,003 B2 * 7/2005 Graf et al. ................ 251/129.07

FOREIGN PATENT DOCUMENTS

DE     196 04 317 A1    8/1997
DE     199 49 234 A1    6/2001
(Continued)

*Primary Examiner* — Kevin Murphy
*Assistant Examiner* — Nicole Wentlandt
(74) *Attorney, Agent, or Firm* — Wenderoth, Lind & Ponack, L.L.P.

(57) ABSTRACT

An electromagnetic proportional 2-way flow control valve (1) has a valve housing (2) in which a control piston (3) is guided to be displaced axially. The control piston (3) actuates at least one fluid-conducting connection (4) between a fluid inlet (5) and an outflow opening (6). An armature (8) can be actuated by a proportional magnet and acts on the control piston (3). A pressure detecting piston (9) serves as the actuator part on the control piston (3). The fluid inlet (5) is connected in a fluid-conducting manner by a pressure detecting channel (11) to a pressure detecting chamber (12) such that the fluid pressure prevailing in the pressure detecting chamber (12) loads the pressure detecting piston (9) and the control piston (3) with a force (F) in the direction of relief of the armature.

23 Claims, 5 Drawing Sheets

(56) References Cited

FOREIGN PATENT DOCUMENTS

| DE | 101 33 990 A1 | 3/2002 |
|---|---|---|
| DE | 10 2004 012 711 A1 | 10/2005 |
| DE | 10 2004 017 088 A1 | 10/2005 |
| DE | 10 2006 039 488 A1 | 3/2007 |
| DE | 10 2005 058 846 A1 | 6/2007 |
| DE | 10 2008 042058 A1 | 3/2009 |
| FR | 2 805 492 A1 | 8/2001 |

* cited by examiner

FLOW CONTROL VALVE

FIELD OF THE INVENTION

The invention relates to a flow control valve, in particular in the form of an electromagnetic 2-way proportional flow control valve, having a valve housing, in which a control piston is guided to be displaced axially. The control piston actuates at least one fluid-conducting connection between a fluid inlet and an outflow opening. An actuator part, in particular an armature, which can be actuated by an actuator, in particular in the form of a proportional solenoid, acts on the control piston.

BACKGROUND OF THE INVENTION

Flow control valves, in particular a 2-way flow control valve, have the function of setting the volume flow to a constant value independently of the pressure differential and the viscosity of a fluid. Depending on the design of the respective flow control valve, the volume flow can be controlled on the influent flow side or the return side of a connected hydraulic consumer. Flow control valves with adjustable volume flow can be implemented by proportional solenoids as the actuators such that a proportional solenoid can produce a parallel shift of the characteristic of the valve concerned.

In this context, the volume flow is adjusted continuously by the proportional solenoid that is actuated by an electronic power amplifier. The proportional valves can be position controlled or force controlled. Usually, a control piston, designed as a sliding piston, acts, subject to the action of the magnetic force of the proportional solenoid, against a compression spring such that an orifice cross section is correspondingly enlarged or decreased. The pressure independence of the volume flow is achieved by a differential pressure valve (pressure compensator), which provides a constant pressure differential at the metering orifice and is normally downstream of this metering orifice.

A directional valve having the aforementioned function is known from the prior art DE 196 04 317 A1. This valve has a hollow cone-shaped valve seat that forms a valve opening range with a valve element. In this case, the valve element has a spherical segmental section. The radius of the spherical segmental section and the opening angle of the hollow cone shaped valve seat are established such that a sealing region is formed when the valve element sits on the valve seat. The valve element is guided in a movable manner in a valve body, with the valve body having a corresponding inner circumferential surface that has a more or less uniform diameter over the entire length of the valve element.

In particular, such flow control valves of a seat-type design have at least two problem areas. First of all, the power demand for the proportional solenoid is relatively high. Secondly, such valves are difficult to actuate with a certain degree of precision in the extreme opening ranges. Hence, the electromagnetic directional valve, disclosed in that document, has a flat characteristic, so that the solenoid drive force is evened out in relation to an identical actuating current over almost the entire range of the valve stroke. This feature is implemented by setting the solenoid drive force such that it has a flat characteristic, to make the control of the valve opening degree easier. However, this feature has the drawback that the solenoid drive force is relatively high with respect to a change in a range in which the current value is correspondingly large. This situation results from the relationship that the solenoid drive force is proportional to the square of the current value. Therefore, the magnitude of change in the solenoid drive force becomes larger in relation to the same magnitude of change in the current.

Therefore, the flow rate of a fluid to be controlled with such valves tends to change abruptly in relation to a small change in the actuating current in a range in which the opening degree of the electromagnetic proportional flow control valve is small. Hence, such flow control valves of the seat-type design have the problem that it is difficult to achieve an accurate flow rate control in a range having a low flow rate at which the flow rate to be controlled is low.

In contrast, the prior art flow control valves of the sliding valve type design generally have a non-minimized power demand and/or a non-minimized size of the proportional solenoid.

SUMMARY OF THE INVENTION

An object of the present invention is to provide an improved electromagnetic proportional flow control valve that permits a small overall size and at the same time a precise volume flow control over the entire anticipated operating range, and that minimizes energy demand.

Such an object is basically achieved by a flow control valve having a pressure detecting piston that serves for the action of the actuator part on the control piston. The fluid inlet is connected in a fluid-conducting manner to a pressure detecting chamber by a pressure detecting duct such that the fluid pressure prevailing in the pressure detecting chamber applies a force to the pressure detecting piston and the control piston in the direction of a relief of the actuator. The pressure detecting piston is loosely connected to the control piston. As a result, forces act on the pressure detecting piston in the direction of a relief of the proportional solenoid. In addition, the necessary actuating forces for the control piston are reduced in that its projection surface is decreased in the fluid flow direction by the cross-sectional area of the pressure detecting piston that extends, as required, into the control piston. As a result, the flow control valve according to the present invention has two design measures in the smallest space to reduce the necessary actuating forces and, thus, the energy consumption for its valve element in the form of the control piston, that is, by the reverse action of the fluid flow on the pressure detecting piston through the application of fluid to the rear side of the pressure detecting piston in the pressure detecting chamber and the associated reduction of the influent flow and/or pressurized projection surface or end face of the control piston itself. In total, the result is a reduction in the resulting overall pressure-effective surface. Thus, in total, the result is an electromagnetically operable flow control valve, which has markedly flat characteristic curves, so that the solenoid drive force of the flow control valve is evened out in relation to an identical actuating current over the entire range of the valve stroke, as a result achieving characteristic curves that are almost 100% linear is possible.

The control surfaces of the control piston and the pressure detecting piston, to which pistons fluid pressure is effectively applied, and when subtracted from each other, a remaining control surface, to which fluid pressure is applied, introduces a force to the two pistons in such a way that the result is a relief for the proportional solenoid. Without the pressure detecting piston with its pressure-effective detecting piston rear side, all of the fluid pressure on the fluid inlet side of the valve would be available on the facing front side of the valve element or the control piston, with the result that the proportional solenoid would have to generate very high actuating forces for the valve element, and respectively the control piston. This state in turn would assume that the proportional solenoids inside the valve device were large in size and also had a correspondingly high energy demand. The use of the pressure detecting piston serves to reduce, as explained, the necessary actuating forces, so that proportional solenoids that are small in size suffice for the actuating functions with a correspondingly low power demand. Moreover, the pressure detecting piston also supports the modular design of the flow valve, because the valve components, including the proportional solenoid, can be installed in standardized size gradations to be able to cover a wide range of performance classes of the fluid flows to be controlled. Surprisingly to the average person skilled in the field of valve engineering, for the first time the actuating force of the proportional solenoid can be reduced through the use of a pressure detecting piston and a fluid guide on its side facing the proportional solenoid.

A preferred embodiment of the flow control valve according to the invention provides that the respective pressure detecting duct produces a permanently fluid-conducting connection between the fluid inlet and the pressure detecting chamber. At the same time, one embodiment provides preferably that the pressure detecting duct totally penetrates the pressure detecting piston in the axial direction. An additional embodiment can provide that, for this purpose, the pressure detecting duct, arranged laterally in the valve housing, is guided past the control piston. In individual cases, such pressure detecting ducts can also be used jointly with a valve construction.

A precise control and actuating characteristic for the flow control valve can be achieved, if, in a preferred embodiment, the pressure detecting piston penetrates the control piston in such a way that the pressure detecting piston defines a metering orifice with a passage opening of the control piston in the area of the free front side of the pressure detecting piston. That metering orifice points in the direction of the fluid inlet side of the flow control valve.

The proportional solenoid with its armature can also be replaced with any other actuator with its actuator part, be it in the form of a hydraulic working cylinder actuation, be it in the form of an electric spindle drive, or the like. In such cases, the result is a reduction in the installation space and the energy required for the respective actuator system that is used.

In an especially preferred embodiment of the flow control valve according to the invention, the armature does not act directly on the control piston, but rather the pressure detecting piston, which totally penetrates the control piston in the axial direction, serves as an intermediate member between the armature and the control piston. That pressure detecting piston is actuated at least indirectly by the armature and is adjusted as a function of the measured pump pressure at the fluid inlet of the control piston, and thus, the opening cross section of the fluid-conducting connection.

In a preferred exemplary embodiment, the pressure detecting piston has a largest end face that is equal to preferably about one-fourth of the end face described by the control piston.

The pressure detecting piston widens in the diameter, preferably, from its side facing the fluid inlet of the flow control valve to the side facing the armature. The control piston is designed, as stated above, as a sliding piston. In this case, a metering orifice opening, which faces the fluid inlet of the flow control valve, has preferably an inside diameter that is about twice as large as the diameter of the pressure detecting piston in this area.

The diameter of the pressure detecting piston or its cross-sectional area is the smallest in the area of the metering orifice of the control piston. The metering orifice can have about the same inside diameter as the largest diameter of the pressure detecting piston or can be slightly larger, so that during assembly the pressure detecting piston can be guided, for example, from the side of the metering orifice opening, through which the control piston can be guided. The pressure detecting piston can be loosely connected to the control piston by a drive plate and, in particular, to the effect that the drive plate can take with it the control piston in the active direction of the energized proportional solenoid coil. In any case, both pistons can move relative to each other in the opposite direction of movement of the armature and the pressure detecting piston. However, preferably, both of those pistons are operatively connected together with a small pretensioning force via the drive plate by a separate compression spring in any position of movement.

The diameter or the cross-sectional area of the pressure detecting piston increases inside the control piston due to a positive difference in diameter. At the point of passage, formed by the drive plate that acts on the control piston, the pressure detecting piston has an additional positive difference in diameter. The drive plate is disposed on the side opposite the metering orifice opening on the control piston. On the side of the metering orifice opening itself, force is applied to the control piston by a compression spring exhibiting the smallest spring rate to ensure the compression of the same and secondly to push, in particular, the control piston with its drive plate against an end stop formed by the abrupt change in diameter in the pressure detecting piston. The second difference in diameter permits an engagement area to be formed on the pressure detecting piston for the drive plate in that precisely the diameter or the cross-sectional area of the pressure detecting piston is made larger in the direction of the proportional solenoid and/or the actuating armature than in the direction of the control piston. The outflow openings, which are configured on the control piston, are arranged radially and penetrate the control piston in a plane at several points that lie preferably diametrically opposite each other relative to the longitudinal axis of the device.

The function of the flow control valve can be pulling or pushing in the sense that, in the non-energized state of the proportional solenoid, the control piston is in a blocking position relative to the said fluid-conducting connection or in an open switching position for the fluid-conducting connection in the valve housing.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure and that are diagrammatic and not to scale.

DETAILED DESCRIPTION OF THE INVENTION

Figure 1:
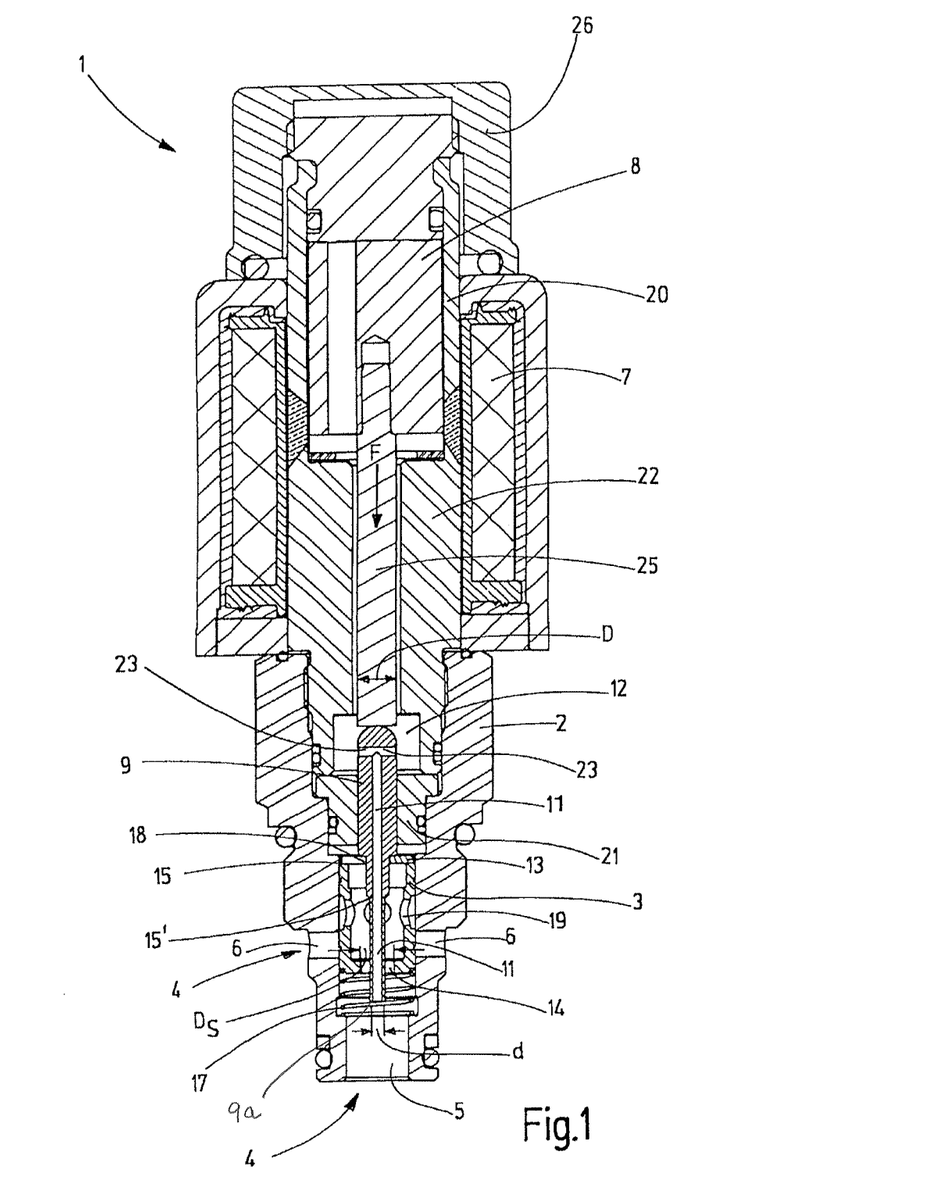
FIG. 1 is a scale elevational view in section of a flow control valve with a closed fluid-conducting connection in a non-energized state of the proportional solenoid according to a first exemplary embodiment of the invention.

FIG. 1 is a longitudinal sectional view of an electromagnetic 2-way proportional flow control valve 1 capable of holding a hydraulic fluid volume flow from a hydraulic fluid pump (not illustrated) to a hydraulically connected consumer (not illustrated) more or less constant, independently of any pressure fluctuations that might occur. The electromagnetic 2-way flow control valve 1 can control the volume flow on the influent flow side or the return side of the hydraulic consumer (not illustrated), for example, in the form of a working cylinder of a construction machine or the like.

The valve, hereinafter referred to only as the flow control valve 1, has a valve housing 2 configured as a screw-in cartridge solution. The lower, axial end of the valve housing 2 has a central fluid inlet 5 and several radial outflow openings or outlet 6, of which two are shown in the longitudinal sectional view. A sleeve shaped control piston 3, designed as a sliding piston, is guided such that, as a valve element, it can be displaced in a drill hole in the valve housing 2. The control piston has a control surface 3a facing inlet 5 and is held by a cylindrical or conical compression spring 17 and biased in the direction of a proportional solenoid 7 screwed in on the other end of the valve housing 2. The control piston 3 has plate-shaped closure members on its two ends. In this case, the plate is formed as an integral part with the control piston 3 in the direction of the fluid inlet 5 and has a metering orifice 14 with a diameter Ds. In this case, the hydraulic fluid can pass from the metering orifice into the interior of the control piston 3.

The plate, which rests against the other end of the control piston, forms a drive plate and is provided with an opening 18. The wall of the control piston 3 itself has radial passage openings 19 that allow a fluid-conducting connection 4 from the fluid inlet 5 to the outflow openings 6 as a function of the position of movement of the control piston 3 or blocks that connection, as shown in FIG. 1. The control piston 3 opens and closes the fluid-conducting connection 4 by the applying force of an armature 8, also referred to as the armature of a magnet in the technical terminology, which armature is moved by the proportional solenoid 7 in a pole tube 20. The proportional solenoid 7 is actuated by a computer unit (not shown in detail) and an associated sensor system. Since that actuation is common for flow control valves, no need exists to enter into the details at this point. A pressure detecting chamber 12 is arranged between a guide plug 21 for the pressure detecting piston 9 and a pole tube base 22 in the valve housing 2 of the flow control valve 1. The pressure detecting piston has a control surface 9a in the pressure detecting chamber 12.

The pressure detecting piston 9 penetrates with its widened region having a diameter D the guide plug 2 that forms a rigid axially sliding bearing for the pressure detecting piston 9. The guide plug 21 and the pole tube base 22 are secured stationarily in the valve housing 2 in a sealing manner. The pressure detecting piston 9 extends in an axially centered manner through the control piston 3 with a diameter that gradually tapers toward the bottom. This pressure detecting piston has a central pressure detecting duct 11, preferably in the form of a drill hole. That pressure detecting duct is designed as a pressure detecting drill hole 11 and extends from the fluid inlet 5 to the pressure detecting chamber 12 into the pressure detecting drill hole 11. Hole 11 is designed as an axial drill hole and empties into at least two radially extending tap holes 23. The pressure detecting piston 9 has an additional difference in diameter 15 at the opening 18 of the closure or drive plate of the control piston 3. The diameter D of the pressure detecting piston, in its region guided by the guide plug 21, decreases to about the diameter at the opening 18.

This decrease in diameter allows a positive locking engagement of the pressure piston 9 and a connection to the control piston 3. The connection is implemented such that the control piston 3 can move relative to the pressure detecting piston 9. At the same time, the compression spring 17 pushes the control piston 3 against the difference in diameter 15 of the pressure detecting piston 9 by the drive plate. The control piston 3 rests loosely with its outer circumference against that drive plate so that such pistons are held permanently in engagement with each other in any position of movement.

Figure 3:
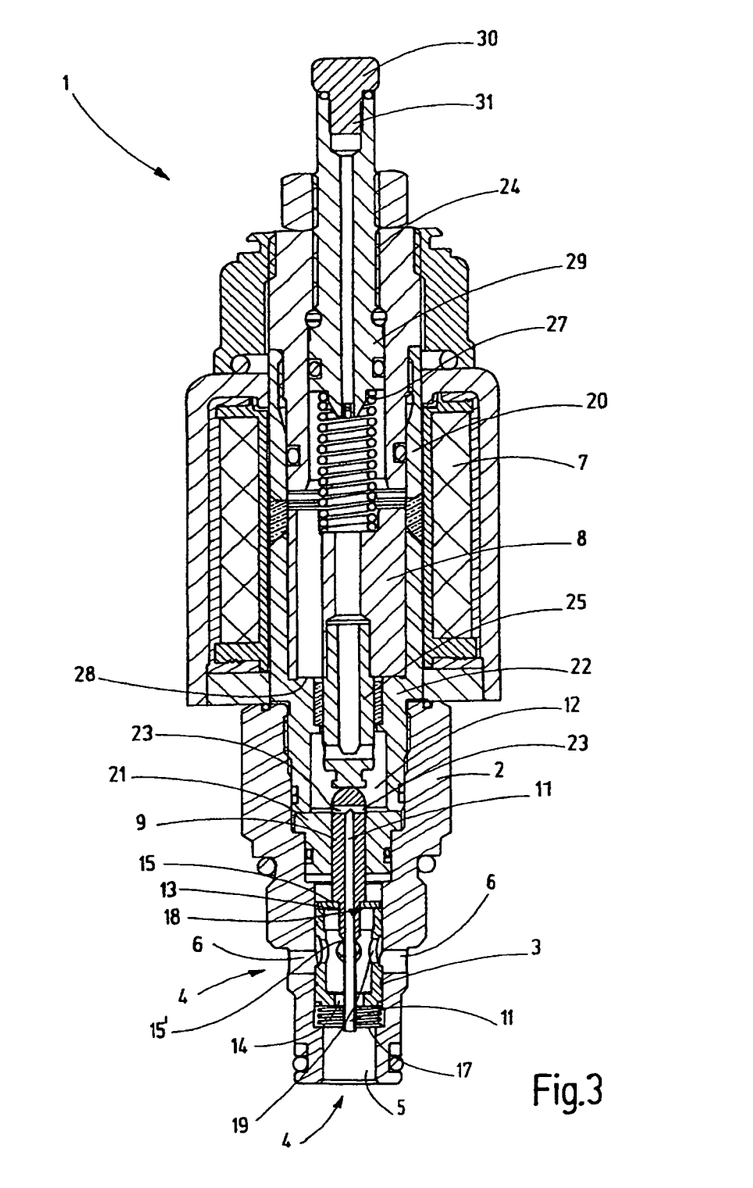
FIG. 3 is a side elevational view in section of a flow control valve with an open fluid-conducting connection in a non-energized state of the proportional solenoid according to a second exemplary embodiment of the invention.
Figure 4:
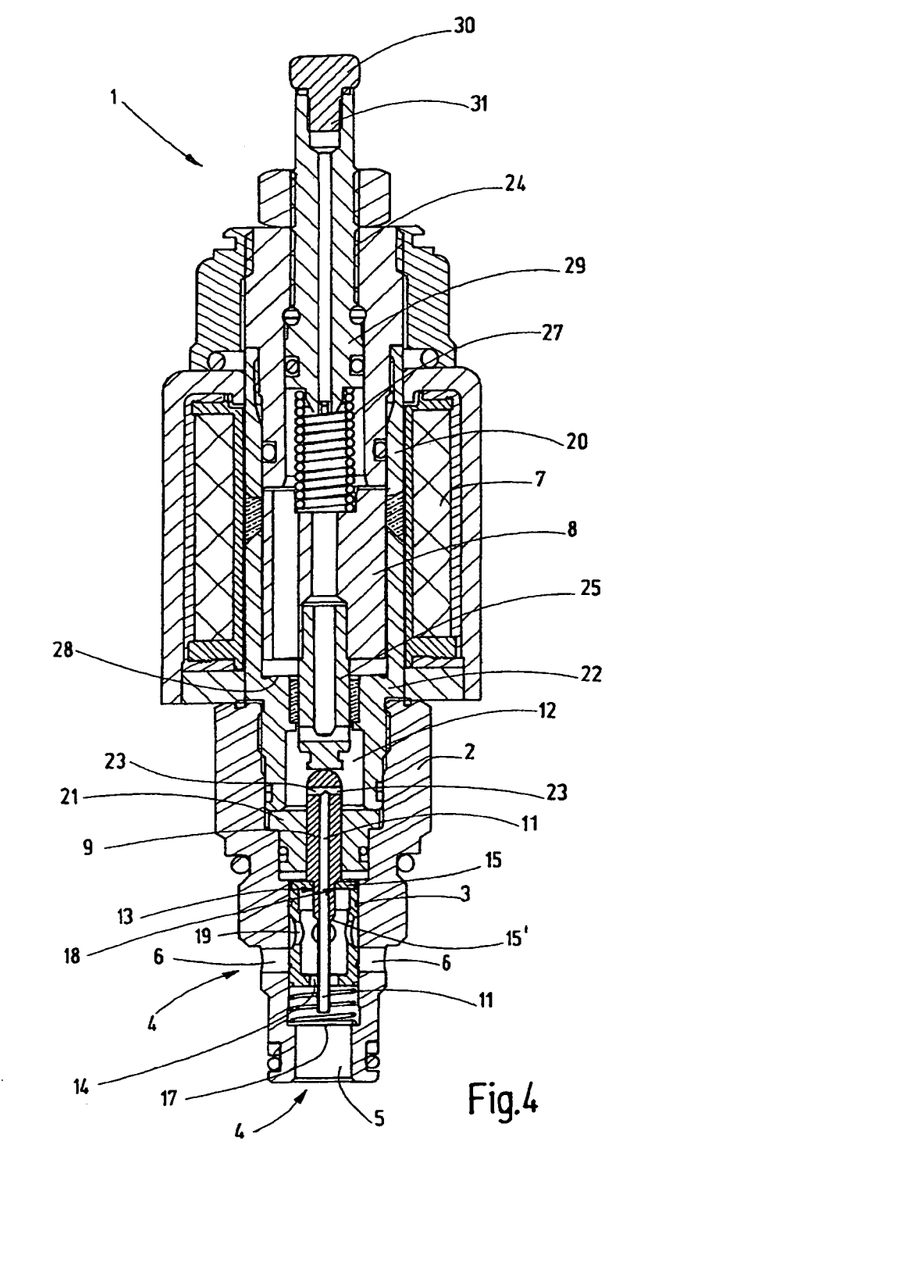
FIG. 4 is a side elevational view in section of the flow control valve of FIG. 3 in a closed state of the fluid-conducting connection in an energized state of the proportional solenoid.

An additional difference in diameter 15' is present at the pressure detecting piston 9 inside its region in the control piston 3. In this case, the outside diameter of the pressure detecting piston 9 decreases to its smallest size d, so that it projects as a hollow needle through the remaining axial region of the control piston 3 in the direction of the fluid inlet 5 to an end face 9a. The second exemplary embodiment according to FIGS. 3 and 4 provides that in its initial position the pressure detecting piston 9 can be loaded with a predefinable actuating force by a tappet 25, which tappet is connected to the armature 8 by a setting thread 24 and is connected on that end of the pressure detecting piston that is located at the pressure detecting chamber.

A pressure compensator is formed by the arrangement of the pressure detecting piston 9 with the control piston 3. The side of the control piston 3 that faces the fluid inlet 5 has a correspondingly high pressure upstream of the metering orifice 14. This high pressure passes over into a comparatively lower pressure value due to the metering orifice 14 and is available at the rear side of the control piston 3 and is correspondingly available on the side of the drive plate that faces away from the fluid inlet 5 due to an engagement slot (opening 18), which is not shown in detail, on the drive plate 13.

Figure 2:
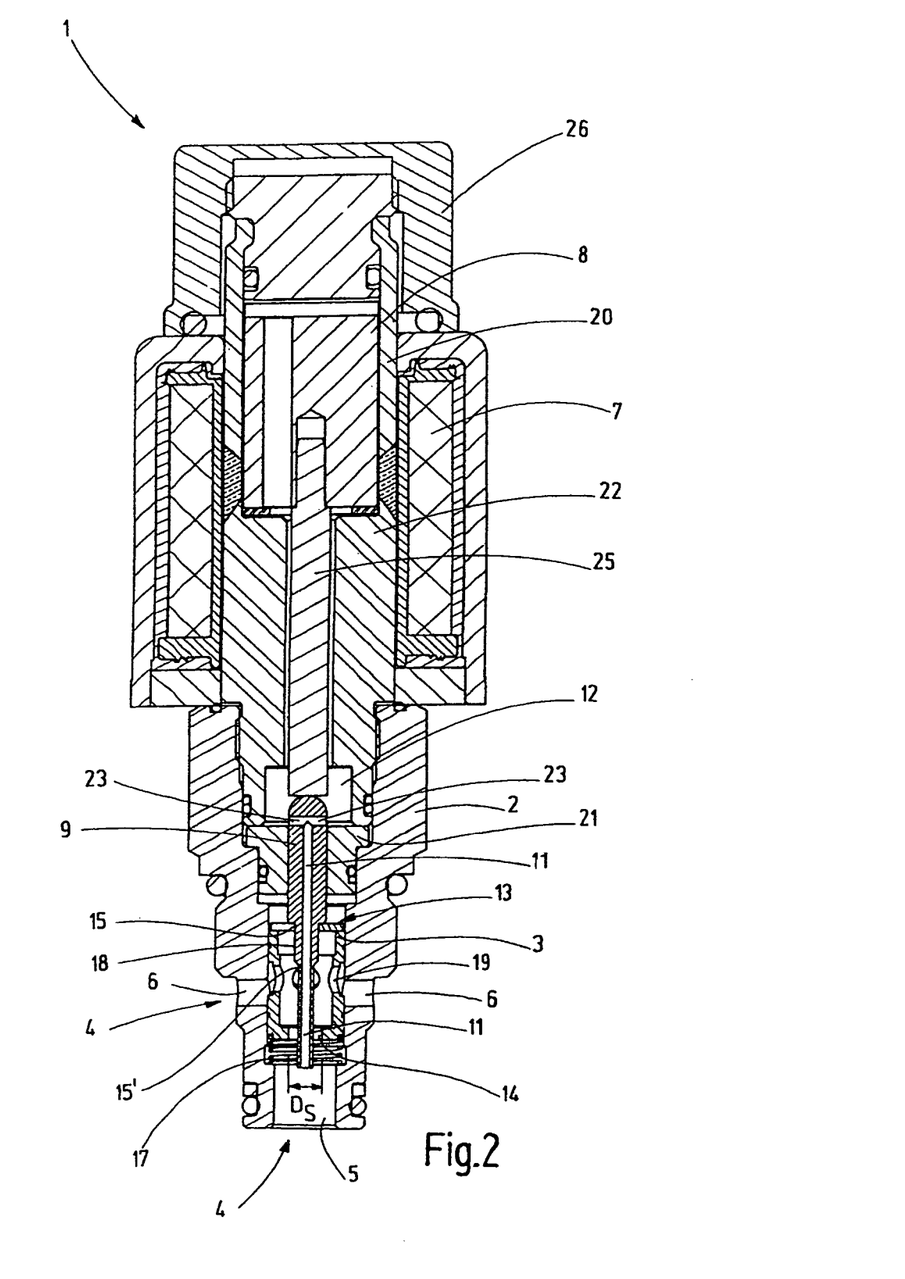
FIG. 2 is a side elevational view in section of the flow control valve of FIG. 1, with an open fluid-conducting connection in an energized state of the proportional solenoid.

In FIG. 2, the proportional solenoid 7 is suitably energized. In this case, the control piston 3 is shown in one of its control positions, and, at the same time, the proportional solenoid 7 passes a proportional force as the pressure force to a tappet 25 connected to the armature 8. This tappet extends through the pressure detecting chamber 12 and acts correspondingly on the upper end of the pressure detecting piston 9. In this respect, the fluid-conducting connection 4 is partially open in that the passage openings 19 of the control piston 3 partially overlap the outflow openings 6 and carry out a control operation to maintain a constant volume flow. Normally, the compression spring 17 is at least partially compressed.

In this embodiment of the electromagnetic flow control valve 1, the pressure that is present in the pressure detecting chamber 12 and that is also available at the pressure-effective control surfaces of the pressure detecting piston 9 by way of the pressure detecting drill hole 11 and the tap holes 23 supports the force effect of the proportional solenoid 7 with a force F in the same direction as the actuating force of the proportional solenoid 7. This force relief allows the use of a proportional solenoid 7 that is smaller in size than is the case in the prior art solutions that dispense with the pressure detecting piston 9 according to the present invention. Furthermore, such a relief is energy saving, because the power consumption for the proportional solenoid 7 is less. Therefore, in this respect, the largest cross section of the pressure detecting piston 9 decreases the projection surface of the control piston. The resulting remaining control surface leads to the force introduction that reduces the load on the proportional solenoid 7.

If the fluid pressure in the fluid inlet 5 increases, the pressure-effective surfaces produce a decrease in the stroke of the armature 8 and the piston 9, so that the overlapping area is reduced by the passage openings 19 and the outflow openings 6, with the result that subject to the control of the outgoing volume flow, this volume flow remains constant the same as before. Thus, the respective outflow opening 6 forms with the respective passage opening 19 assigned to each other the control orifice of the flow valve 1. Owing to the play-restricted tappet guide for the tappet 25 in the pole tube base 22 and owing to a passage drill hole in the magnet armature 8, the pressure prevailing in the pressure detecting chamber 12 is also available at the armature 8 in a pressure compensating manner. This feature guarantees a smooth operation of the armature/tappet arrangement. The armature 8, guided in the pole tube 20, is provided outward in the conventional manner with a closure cap 26. Cap 26 is connected to the other valve parts of the flow control valve 1 in the manner of a screwed connection. That screwed connection allows the proportional solenoid 7 to be secured on the pole tube 20 and the pole tube base 22.

FIGS. 3 and 4 show in each instance an additional design variant of the electromagnetic 2-way proportional flow control valve 1, where the key components of the valve 1 and, in particular, the components installed in its valve housing 2, are more or less identical to those of the embodiment depicted in FIGS. 1 and 2. Therefore, the same reference numerals and the related statements, which have already been provided for this purpose, apply to the identical components. However, in contrast to the exemplary embodiment shown in FIGS. 1 and 2, the armature does not act here on the pressure detecting piston 9 in a pushing manner, but rather it acts in a pulling manner in the direction of releasing a displacement path provided for the control piston 3. Therefore, FIG. 3 shows an opened switching position in the non-energized state of the magnetic coil 7. FIG. 4 shows an essentially closed switching position in the energized state.

According to the drawing in FIG. 3, the pressure detecting piston 9 is pushed, in the viewing direction of the observer, downward with the control piston 3 and, in particular, subject to the action of a compression spring 27. Spring 27 exerts a force on the armature 8 of the magnet against the effect of the compression spring 17. In FIG. 4, the proportional solenoid 7 is energized, so that the armature 8 and the tappet 25 are moved upward and, in particular, against the effect of the said compression spring 27. Owing to the prevailing, above-described pressure conditions, the control piston 3 and the pressure detecting piston 9 also move upward, when seen in the direction of FIG. 4. The result is a closing position for the fluid-conducting connection 4.

In so far as the armature 8 in the drawing according to FIG. 3 is moved downward by the additional compression spring 27, the armature 8 rests against a bottom end stop 28 in the lowest position of movement and is guided in the pole tube 20. To adjust the actuating force of the compression spring 27, an adjusting spindle 29, is guided in a rotatable manner in the valve arrangement by a setting thread 24. In addition, the upper free end of the spindle 29 is closed with a bleed screw 30 that engages with a screw segment 31 in an assigned internal thread at the free end of the spindle 29. Such arrangement allows the dead current to be adjusted by the thread under discussion.

Figure 5:
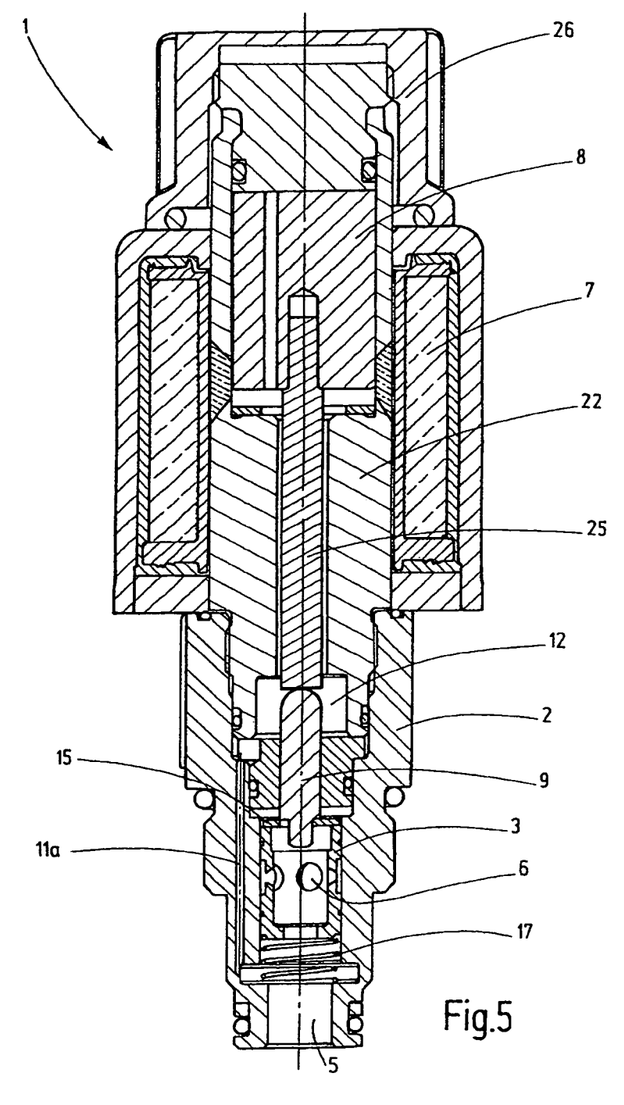
FIG. 5 is a side elevational view in section of a flow control valve, in which a pressure detecting duct is arranged inside the valve housing and is guided past the control piston, according to a third exemplary embodiment of the invention.

In the third embodiment according to the longitudinal sectional view in FIG. 5, the pressure detecting duct 11a does not extend through the pressure detecting piston 9. Rather, duct 11a extends parallel to the longitudinal or actuating axis of the flow control valve as the drilled longitudinal duct in the valve housing 2, and thus, is guided past the control piston in parallel to the control piston 3. In this embodiment, the pressure detecting piston comprises one solid piece and penetrates the drive plate 15 of the control piston 3 with a pin-like projection. Furthermore, at this point the metering orifice 14 is formed by the free lower opening cross section of the control piston 3. However, the pressure detecting duct 11a also conveys, as in the case of the above-described solutions, the fluid pressure from the fluid inlet side 5 to the rear side of the pressure detecting piston 9, in that the duct 11a empties into the pressure chamber 12.

While various embodiments have been chosen to illustrate the invention, it will be understood by those skilled in the art that various changes and modifications can be made therein without departing from the scope of the invention as defined in the appended claims.

The invention claimed is:

1. An electromagnetic two-way proportional flow control valve, comprising:
a valve housing having a fluid inlet and an outflow opening;
a control piston guided for axial displacement in said housing and actuating at least one fluid-conducting connection between said fluid inlet and said outflow opening; said control piston having a control surface facing said fluid inlet;
an armature actuated by a proportional solenoid acting on said control piston;
a pressure detecting piston being separable from and acting on an actuator part on said control piston and penetrating a guide plug in said valve housing, said guide plug forming a rigid and axially sliding bearing for said pressure detecting piston, said pressure detecting piston having a control surface; and
a pressure detecting chamber in said valve housing connected in fluid communication with said fluid inlet via a pressure detecting duct conveying fluid pressure into said pressure detecting chamber to apply a force to said pressure detecting piston and said control piston relieving force on said armature, said pressure detecting piston penetrating said control piston to define a metering opening with a passage opening of said control piston in an area of a free front side of said pressure detecting piston, said control surface of said pressure detecting piston being in said pressure detecting chamber, a difference in areas of said control surfaces introducing a force on said control piston and said pressure detecting piston relieving said armature.

2. The electromagnetic two-way proportional control valve according to claim 1 wherein
said pressure detecting duct produces a permanent fluid-conducting connection between said fluid inlet and said pressure detecting chamber and axially penetrates said pressure detecting piston.

3. The electromagnetic two-way proportional control valve according to claim 1 wherein
said armature is axially displaceable by said proportional solenoid and acts permanently on said control piston via said pressure detecting piston as an intermediate member.

4. The electromagnetic two-way proportional control valve according to claim 1 wherein
said free front side of said pressure detecting piston comprises an end face facing said fluid inlet that is about one-fourth of an end face of said control piston facing in a direction of said fluid inlet.

5. The electromagnetic two-way proportional control valve according to claim 1 wherein
said pressure detecting piston is loosely connected to said control piston by a drive plate.

6. The electromagnetic two-way proportional control valve according to claim 5 wherein
said drive plate permits said control piston to move freely in an axial direction relative to the pressure detecting piston.

7. The electromagnetic two-way proportional control valve according to claim 1 wherein
said pressure detecting piston comprises a plurality of abrupt changes in outside diameter, with the outside diameter thereof in a direction adjacent said fluid inlet being the smallest thereof.

8. The electromagnetic two-way proportional control valve according to claim 1 wherein
said pressure detecting piston has a larger cross-sectional area in a direction of said proportional solenoid than in a direction of said control piston.

9. The electromagnetic two-way proportional control valve according to claim 1 wherein
said control piston is in a blocking position relative to said fluid-conducting connection in a non-energized state of said proportional solenoid.

10. The electromagnetic two-way proportional control valve according to claim 1 wherein
said control piston is in an open switching position relative to said fluid-conducting connection in a non-energized state of said proportional solenoid.

11. The electromagnetic two-way proportional control valve according to claim 1 wherein
a spring between said valve housing and said control piston biases said control piston against said pressure detecting piston.

12. An electromagnetic two-way proportional control valve, comprising:
a valve housing having a fluid inlet and an outflow opening;
a control piston guided for axial displacement in said housing and actuating at least one fluid-conducting connection between said fluid inlet and said outflow opening;
an armature actuated by a proportional solenoid acting on said control piston;
a pressure detecting piston being separable from and acting on an actuator part on said control piston and penetrating a guide plug in said valve housing, said guide plug forming a rigid and axially sliding bearing for said pressure detecting piston; and
a pressure detecting chamber in said valve housing connected in fluid communication with said fluid inlet via a pressure detecting duct conveying fluid pressure into said pressure detecting chamber to apply a force to said pressure detecting piston and said control piston relieving force on said armature, said pressure detecting piston penetrating said control piston to define a metering opening with a passage opening of said control piston in an area of a free front side of said pressure detecting piston,
said control piston being a sliding piston and having said metering opening facing in a direction of said fluid inlet, said metering opening being penetrated by a free end of said free front side of said pressure detecting piston and having an inside diameter about twice as large as a diameter of said pressure detecting piston in an area of said metering opening.

13. The electromagnetic two-way proportional control valve according to claim 12 wherein
said inside diameter of said metering opening is about equal to a largest diameter of said pressure detecting piston.

14. The electromagnetic two-way proportional control valve according to claim 12 wherein
said control piston has a control surface facing said fluid inlet;
said pressure detecting piston has a control surface in said pressure detecting chamber; and
a difference in areas of said control surfaces introduces a force on said control piston and said pressure detecting piston relieving said armature.

15. The electromagnetic two-way proportional flow control valve, comprising:
a valve housing having a fluid inlet and an outflow opening;
a control piston guided for axial displacement in said housing and actuating at least one fluid-conducting connection between said fluid inlet and said outflow opening, said control piston having a control surface facing said fluid inlet;
an armature actuated by a proportional solenoid acting on said control piston;
a pressure detecting piston being separable from and acting on an actuator part on said control piston and penetrating a guide plug in said valve housing, said guide plug forming a rigid and axially sliding bearing for said pressure detecting piston, said pressure detecting piston having a control surface; and
a pressure detecting chamber in said valve housing connected in fluid communication with said fluid inlet via a pressure detecting duct conveying fluid pressure into said pressure detecting chamber to apply a force to said pressure detecting piston and said control piston relieving force on said armature, said pressure detecting piston penetrating said control piston, said pressure detecting duct extending parallel to a longitudinal axis of said valve housing, said control surface of said pressure detecting piston being in said pressure detecting chamber, a difference in areas of said control surfaces introducing a force on said control piston and said pressure detecting piston relieving said armature; and
a metering opening formed by a free lower opening cross section of said control piston.

16. The electromagnetic two-way proportional control valve according to claim 15 wherein
said pressure detecting duct is arranged laterally in said valve housing spaced from said control piston and said pressure detecting piston.

17. The electromagnetic two-way proportional control valve according to claim 15 wherein
a spring between said valve housing and said control piston biases said control piston against said pressure detecting piston.

18. The electromagnetic two-way proportional control valve according to claim 15 wherein
said pressure detecting duct produces a permanent fluid-conducting connection between said fluid inlet and said pressure detecting chamber.

19. The electromagnetic two-way proportional control valve according to claim 15 wherein
   said armature is axially displaceable by said proportional solenoid and acts permanently on said control piston via said pressure detecting piston as an intermediate member.

20. The electromagnetic two-way proportional control valve according to claim 15 wherein
   said pressure detecting piston comprises an end face facing said fluid inlet that is about one-fourth of an end face of said control piston facing in a direction of said fluid inlet.

21. The electromagnetic two-way proportional control valve according to claim 15 wherein
   said pressure detecting piston is loosely connected to said control piston by a drive plate.

22. The electromagnetic two-way proportional control valve according to claim 21 wherein
   said drive plate permits said control piston to move freely in an axial direction relative to the pressure detecting piston.

23. The electromagnetic two-way proportional control valve according to claim 15 wherein
   said pressure detecting piston has a larger cross-sectional area in a direction of said proportional solenoid than in a direction of said control piston.

* * * * *